May 11, 1971  B. J. POPE  3,578,416
HIGH TEMPERATURE REACTOR
Filed Dec. 19, 1968  4 Sheets-Sheet 1
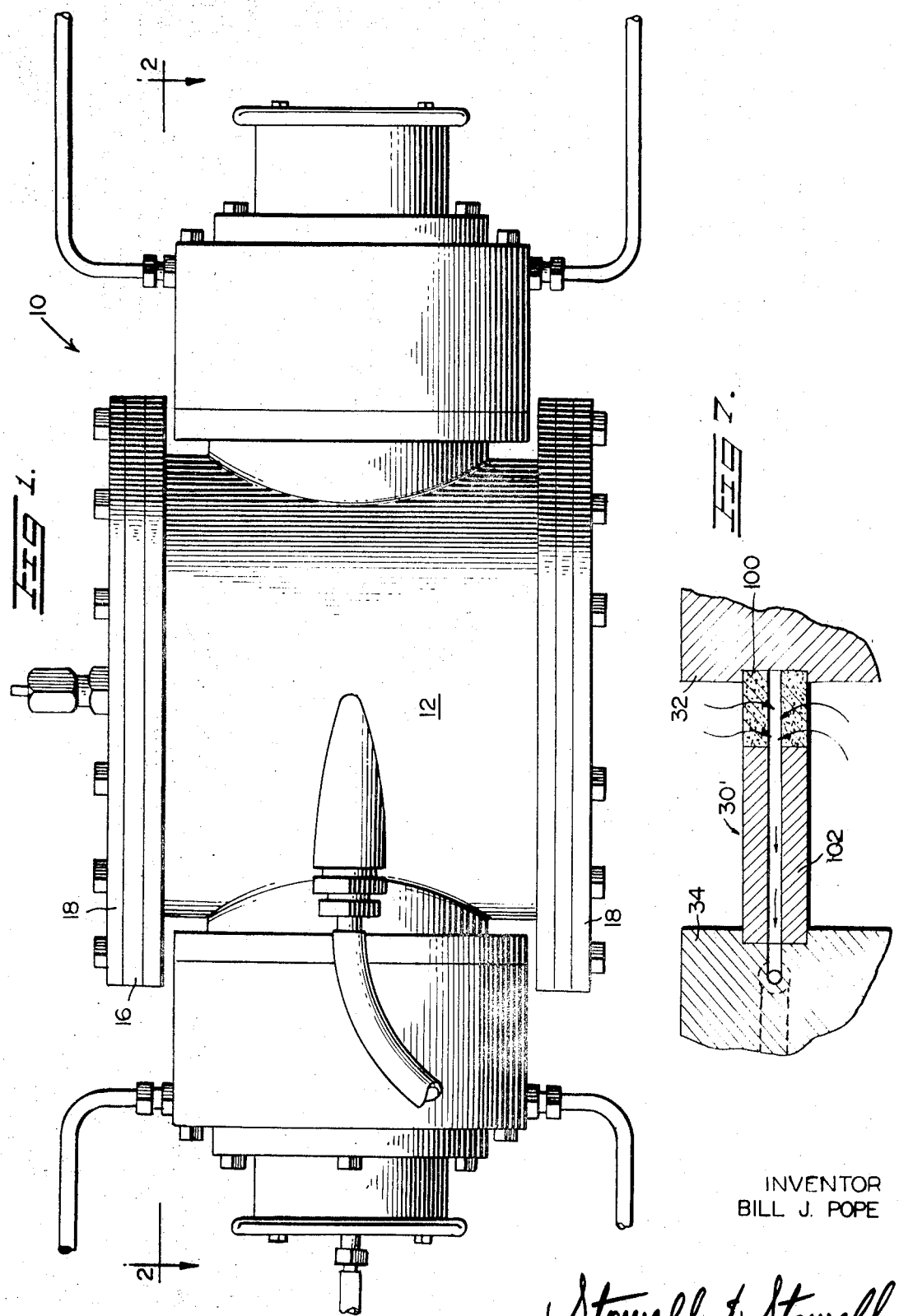
INVENTOR
BILL J. POPE
Stowell & Stowell
ATTORNEYS

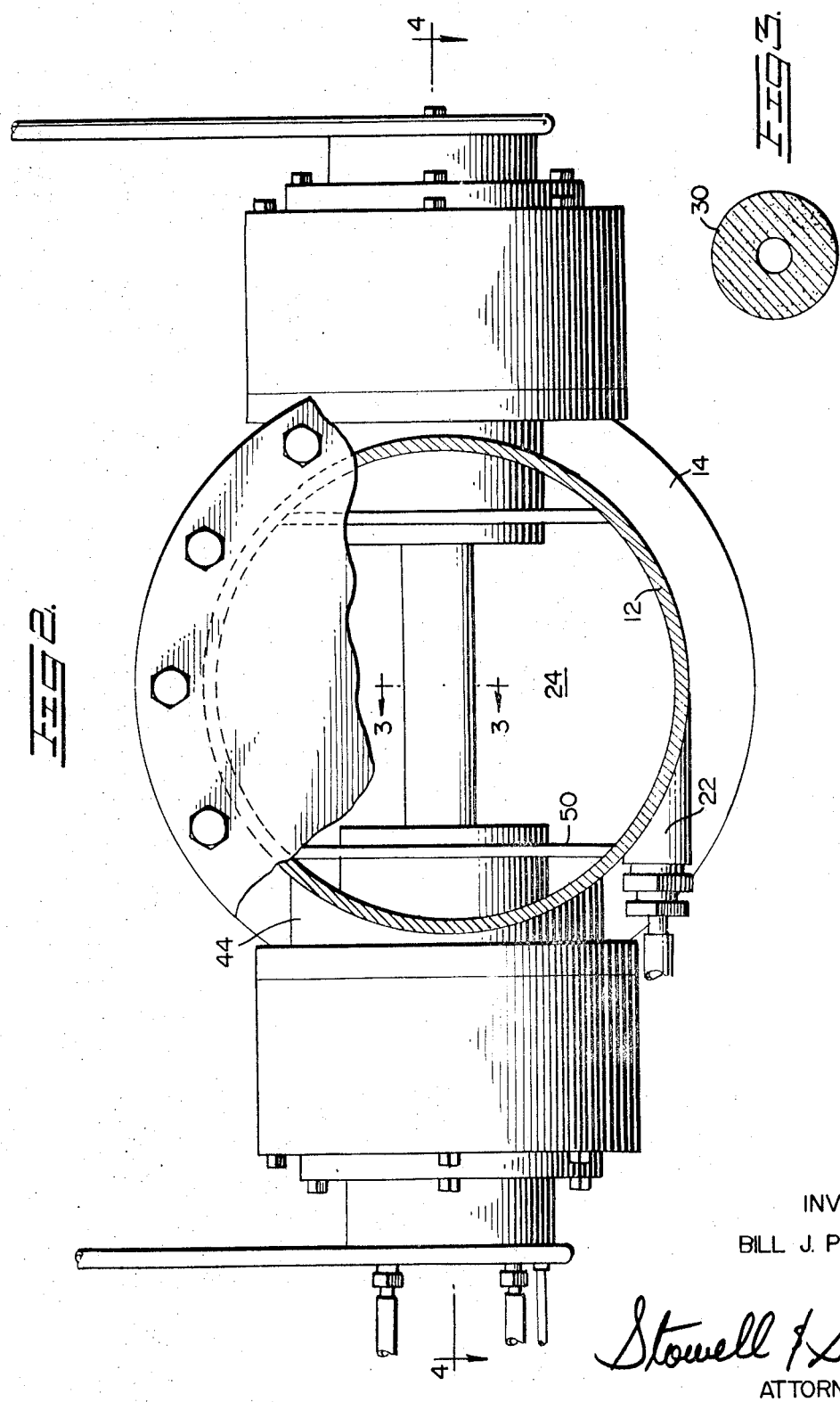

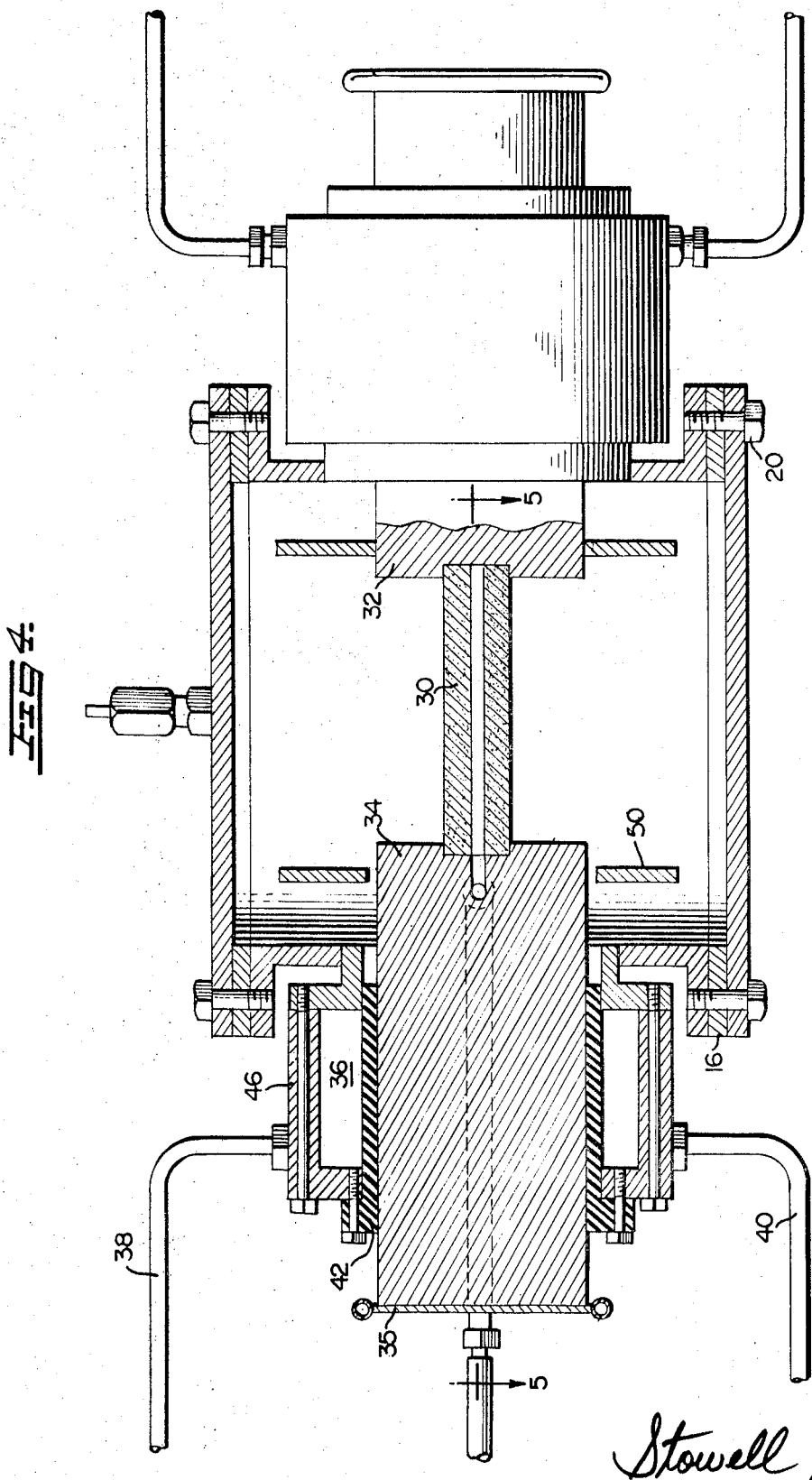

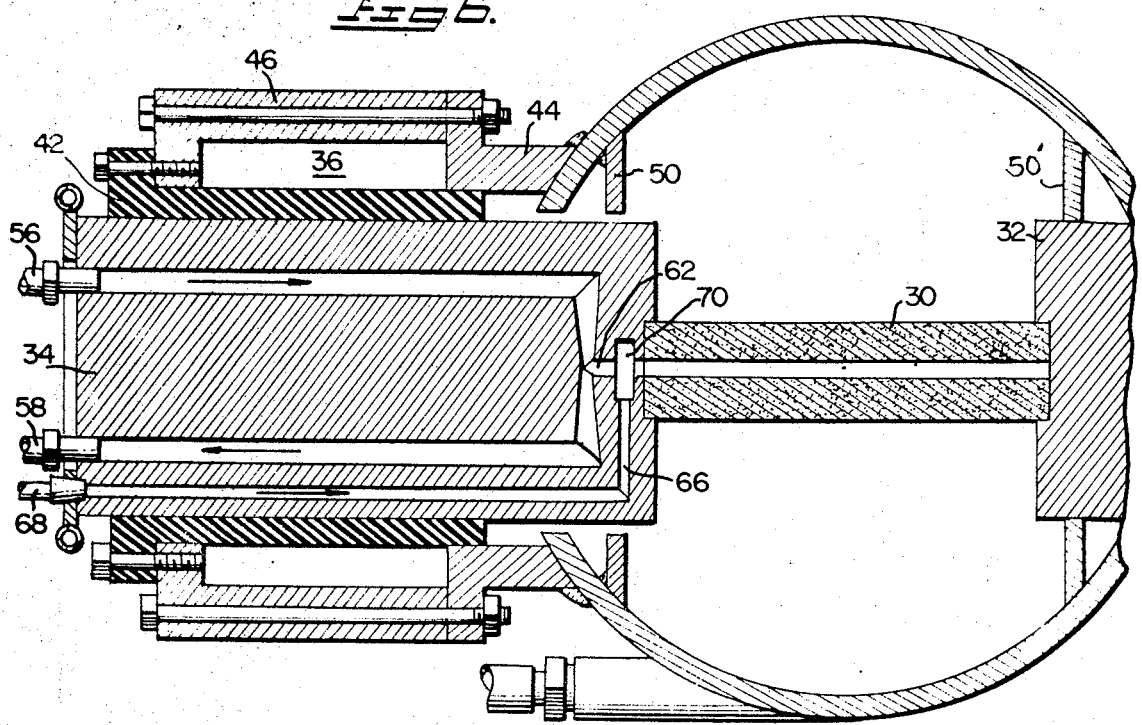
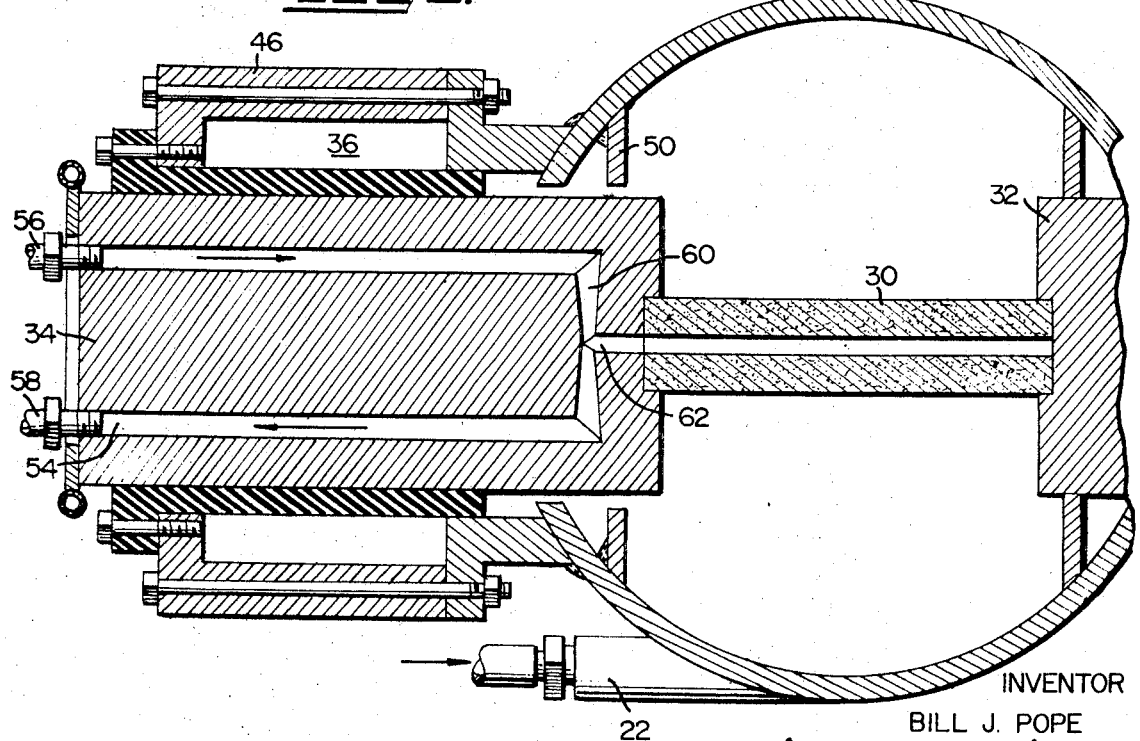

United States Patent Office 3,578,416
Patented May 11, 1971

3,578,416
HIGH TEMPERATURE REACTOR
Bill J. Pope, Department of Chemical Engineering,
Brigham Young University, Provo, Utah 48601
Filed Dec. 19, 1968, Ser. No. 785,156
Int. Cl. F27d 11/04
U.S. Cl. 23—277
3 Claims

ABSTRACT OF THE DISCLOSURE

A high temperature gas reactor is provided for carrying out high temperature chemical reactions. The reactor includes a porous member, having electrical resistance properties, mounted in a gas introduction chamber. A first gas is introduced into the chamber and is heated as it passes through the porous member. A second gas communicates with the heated first gas at a Venturi passage which Venturi passage is adapted to draw the heated first gas from the gas introduction chamber through the porous member. In an embodiment, an auxiliary reaction chamber is positioned between the porous member and the Venturi passage and a third gas is supplied to said auxiliary chamber.

---

This invention relates to an apparatus for carrying out high temperature reactions between various gases.

Certain industrial processes make use of chemical reactions which take place at extremely high temperatures between two or more reacting gases. For example, vinyl chloride may be produced by reacting hydrocarbon gases at very high temperatures with chlorine gas at somewhat lower temperatures. Further, the efficiency of the reaction, as measured by the amount of end product yield, may also depend upon the time in which the two gases are allowed to dwell together at the elevated reaction temperature.

According to the practice of this invention the mixing of reactant gases at high temperatures is facilitated and the dwell time controlled by varying certain pressures associated with each of the reactant gases. In an embodiment an auxiliary chamber is provided for the introduction of a third kind of reactant gas. Alternatively, a neutral gas instead of a third reactant gas may be introduced into the auxiliary chamber. The invention further comprehends as one of its salient features the use of a Venturi section in a flow passageway, serving to more positively draw one of the reactant gases from the interior of a porous heating element into a reactant chamber or cavity. This same drawing away further admits of control over the dwell time of the reaction at the highest and at intermediate temperatures.

In the drawings:

FIG. 1 is a side elevational view of a high temperature gas reaction furnace according to this invention;

FIG. 2 is a partially broken away view along line 2—2 of FIG. 1;

FIG. 3 is a view taken along section 3—3 of FIG. 2;

FIG. 4 is a cross-sectional view taken along 4—4 of FIG. 2;

FIG. 5 is a view taken along section 5—5 of FIG. 4;

FIG. 6 is a view similar to FIG. 5, showing an embodiment, and

FIG. 7 is fragmentary sectional view of a modified form of a porous resistance element.

Turning now to the drawings, the numeral 10 denotes generally a high temperature gas reaction furnace or reactor according to this invention and includes a generally cylindrical casing 12 whose upper and lower portions are provided with integral flanges 14. Gasket members 16 are interposed between the flanges and outer covers 18, the latter being held together by means of a plurality of annularly arranged bolts or other fasteners 20.

The numeral 22 denotes a gas input conduit preferably tangentially mounted on the casing 12. A reactant gas of a first kind adapted to be fed through input 22 into hermetic chamber 24 defined by casing 12 and its upper and lower covers.

The numeral 30 denotes a porous tube element, formed for example of carbon or of a porous ceramic made electrically conductive by a metallic deposition layer. A metallic or deposition layer of other material may be selected which has catalytic properties. For example, the metallic material may be platinum and perform as a catalyst in the isomerization of normal butane.

The tube is mounted between two electrodes 32 and 34 which are preferably water cooled. The tube 30 may be described as a porous resistance element adapted to have its temperature raised when currents of high magnitude are passed therethrough via the electrodes 32 and 34. The numeral 36 (note FIG. 4) denotes a water-cooling chamber for the electrode 34, it being understood that a similar construction is used for electrode 32. Inlet conduits 38 and outlet tubes 40 carry a coolant fluid into and out of annular cavity 36. As shown again at FIG. 4 of the drawings, an insulating sleeve 42 surrounds a major portion of the periphery of electrode 34 and functions to electrically insulate the electrode from the mounting which maintains it in its illustrated position with respect to the hermetic or gas introduction chamber 24. An identical construction is employed for electrode 32. The numeral 35 denotes an electrical plate or fuse box bolted to the outer end of electrode 34, a similar construction employed for electrode 32. The plate is peripherally cooled by water or other cooling fluid, and receives a current lead bolted thereto.

The numeral 44 denotes a bushing secured as by welding to the cylindrical metal casing 12 and to which is secured, as by a plurality of bolts, a sleeve bushing 46. As shown at FIG. 4, the bushing 46 in turn supports the insulating bushing 42 and is secured thereto by bolts. As shown at FIGS. 2 and 5, a rectangular baffle element 50, having an aperture therein for the reception of electrode 34, is positioned by welding on the interior surface of casing 12. Baffle 50 and a corresponding baffle 50', associated with electrode 32, have heights less than the height of the interior of the casing 12 to thereby provide passages for the flow of, at least a portion, the gas introduced into the chamber about each of the electrodes 32 and 34. Thus the zones, about electrodes 32 and 34, radially outward of the baffles have gas preheating functions and reduce the heating requirements of the porous member 30. With the current leads attached to the outer electrode ends, currents of rather high magnitude pass through the electrodes and porous heater element 30, heating the latter.

Referring now particularly to FIG. 5 of the drawings, the numeral 54 denotes a generally U-shaped quenching fluid passageway in electrode 34, having an inlet conduit 56 attached to the end of one leg of the U and an outlet conduit 58 attached to the other leg. The middle portion is a Venturi section denoted by the numeral 60 and is defined by a convergent and then divergent portion. A bore or passageway 62 extends at right angles to the Venturi section 60 and is located so that one end of the bore is in communication with the throat or constriction of the Venturi section and the other end leads directly into the interior of porous element 30.

In the operation of this embodiment of the invention, a reactant gas of a first kind is introduced through conduit 2 tangentially into the hermetic chamber 24. At the same time a gas of a second kind is caused to flow through passageway 54, entering through conduit 56 and leaving through conduit 58. The gas of the first kind is heated to an extremely high or any desired temperature by passing radially through the porous tube 30. The well known I²R heating effect heats the tube. It will here be observed that this heating of the tube 30 is completely similar to the action of a common incandescent light. With continued build-up of pressure within chamber 24 from the beginning of the process, the reactant gas of the first kind, now at high temperature, passes through the pores of 30. The tube's right end being closed, the gas can exit through bore 62 if the pressure therein is less than the pressure within the porous member 30. By virtue of the Venturi section 60, the pressure at its throat is less than the pressure of the gas at bore 62 and hence within the porous member 30. This causes the reactant gas of the first kind, within 30, to pass from the interior of the porous element 30 and mix with the reactant gas of the second kind in bore 54. This second gas is generally at a much lower temperature, and may therefore be referred to as a quenching gas. For example, in the well-known pyrolysis of methane to acetylene, for which the reactor is particularly well-suited, both reactant gas of the first kind and reactant gas of the second kind or quench gas may be methane. The main reaction in this case is the cracking of methane to hydrogen and carbon-free radicals. Quenching with cold methane so rapidly that chemical equilibrium is not attained maximizes the subsequent recombination to acetylene, the desired product.

It will now be apparent that by controlling the pressure differential between the legs of passageway 54, and by controlling the entry of the reactant gas of the first kind fed into chamber 24, a desired pressure differential between the interior of porous element 30 and the Venturi throat may be realized. This in turn determines the time which the two reactant gases spend or dwell together at the temperature of the reactant gas of the first kind. Still further, it will be apparent that this pressure differential may be employed to control the relative quantities of the two reactant gases as well as determine the dwell period at the highest temperature. In practice because of the high temperatures involved, as high as 3600° F., some routine empirical determination of pressure ranges for various reactions may be required. The mixture of the two gases now passes out through tubular element 58 and by this time the reaction between the two gases has in general fully taken place. The mixture contains the desired end reaction product or products, and known separation techniques are employed for their recovery.

Turning now to FIG. 6 of the drawings, an embodiment is illustrated which is in all respects identical to the embodiment of FIG. 5, except for the addition of a passageway 66 in electrode 34. The passage is fed by a tubular conduit 68 at one end and a rather small cavity 70, which lies at its other end, is intersected by the bore 62. Here, three different reactant gases may be mixed or only two reactant gases may be employed while the third may be neutral gas or may even function as a reaction catalyst. The mixture of the reactant gases will still, in general, take place either at the throat of the Venturi section or between the throat and the chamber 70. In some instances, however, the reaction may take place directly within chamber 70, with the end reactants being drawn out by the action of the Venturi section with abrupt quenching or termination of the reaction occurring in the Venturi throat section upon contact with the low temperature quench gas.

In the illustrated form of the invention shown in FIGS. 1 through 6, the tube element 30 is porous throughout its length. However, the tube may be formed partially porous and partially from solid electrically conductive material as illustrated in FIG. 7 wherein the tube is generally designated 30', the porous section is designated 100 and the conductive solid portion is designated 102. It has been found that with certain reactions increased yield is obtained by using the shortened porous tube of FIG. 7 and having all of the gas flow through the heated solid tube.

Throughout the specification and claims, the first, second and third gases may each be different or they may comprise the same gas at different energy levels and reference to a gas is intended to include a single gas or gas mixtures. Further, it will be recognized that the quench fluid and the secondary reactant may be liquids.

What is claimed is:
1. A gas reactor furnace for controlling high temperature chemical reactions including:
   (a) a casing defining a hermetic chamber,
   (b) means supplying a first gas to said chamber,
   (c) a gas pervious resistance element in said chamber,
   (d) means establishing a flow of electric current through said element for heating thereof,
   (e) a gas flow passageway having a Venturi section therein,
   (f) means including an inlet and outlet to said passageway for flowing a second gas therethrough,
   (g) means providing fluid communication between one end of said element and said Venturi section proximate the throat thereof,
   (h) whereby the flow of said second gas through said Venturi section establishes a reduced pressure therein which draws said first gas through said element for heating thereof into said Venturi section for mixing said second gas.
2. A gas reactor in accordance with claim 1 further including:
   (a) an auxiliary chamber intersected by said means providing fluid communication between one end of said element and said Venturi section, and
   (b) passage means for communicating a third gas to said auxiliary chamber.
3. A gas reactor furnace in accordance with claim 1 wherein said resistance element is tubular with one end thereof closed and wherein said means for providing fluid communication with said Venturi section is connected to the open end thereof.

References Cited

UNITED STATES PATENTS

| | | | |
|---|---|---|---|
| 1,124,347 | 1/1915 | Snelling | 48—224UX |
| 2,622,969 | 12/1952 | Deanesly et al. | 23—284 |
| 2,768,277 | 10/1956 | Buck et al. | 13—25X |
| 2,778,866 | 1/1957 | Sanz et al. | 13—20 |
| 3,124,425 | 3/1964 | Richelsen | 23—277 |
| 3,477,827 | 11/1969 | Mott | 23—288 |

JAMES H. TAYMAN, JR., Primary Examiner

U.S. Cl. X.R.

13—20, 25; 23—1, 284, 252; 48—65; 219—381, 338